United States Patent
Yu

(10) Patent No.: US 8,301,138 B2
(45) Date of Patent: Oct. 30, 2012

(54) CELL SEARCH METHOD AND APPARATUS IN WIRELESS COMMUNICATION SYSTEM

(75) Inventor: Byung Wan Yu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 397 days.

(21) Appl. No.: 12/622,699

(22) Filed: Nov. 20, 2009

(65) Prior Publication Data

US 2010/0130201 A1    May 27, 2010

(30) Foreign Application Priority Data

Nov. 21, 2008 (KR) ................. 10-2008-0115971

(51) Int. Cl.
*H04W 4/00* (2009.01)

(52) U.S. Cl. ........ 455/434; 455/524; 455/525; 370/350; 370/331; 370/328

(58) Field of Classification Search ................. 455/524, 455/525, 67.11, 67.16, 502, 436, 435.2, 439, 455/514, 115.2, 434, 187.1; 370/331, 332, 370/350, 503, 479, 335, 320, 345, 328; 375/150, 375/140, 344, 260, 131, 362
See application file for complete search history.

(56) References Cited

U.S. PATENT DOCUMENTS

| | | | | |
|---|---|---|---|---|
| 6,930,995 | B1 * | 8/2005 | Heinonen et al. | 370/350 |
| 7,308,017 | B2 * | 12/2007 | Jiang et al. | 375/140 |
| 2003/0095516 | A1 * | 5/2003 | Ok et al. | 370/331 |
| 2003/0202541 | A1 * | 10/2003 | Lim et al. | 370/503 |
| 2004/0081114 | A1 * | 4/2004 | Jiang et al. | 370/320 |
| 2005/0281231 | A1 * | 12/2005 | Kwon et al. | 370/335 |
| 2006/0062196 | A1 * | 3/2006 | Cai et al. | 370/345 |
| 2008/0014886 | A1 * | 1/2008 | Lee et al. | 455/187.1 |
| 2008/0025260 | A1 * | 1/2008 | Matsuo et al. | 370/331 |
| 2009/0034589 | A1 * | 2/2009 | Hahm et al. | 375/150 |
| 2009/0067386 | A1 * | 3/2009 | Kitazoe | 370/332 |
| 2009/0213833 | A1 * | 8/2009 | Cai et al. | 370/350 |
| 2010/0069066 | A1 * | 3/2010 | Shen et al. | 455/434 |
| 2010/0265882 | A1 * | 10/2010 | Nagata et al. | 370/328 |
| 2011/0194571 | A1 * | 8/2011 | Ozluturk et al. | 370/479 |

* cited by examiner

*Primary Examiner* — Tan Trinh

(74) *Attorney, Agent, or Firm* — Jefferson IP Law, LLP

(57) ABSTRACT

A cell search method and apparatus in an asynchronous wireless communication system for outputting a cell search result by comparing energy ratios of detected candidate cells with a reference threshold ratio are provided. The method includes determining energy values of correlations between different phases of signals received from neighbor cells, detecting at least one candidate cell in descending order of energy values, and outputting cell search results by determining an energy ratio of the at least one candidate cell and comparing the energy ratio with a reference threshold ratio.

18 Claims, 4 Drawing Sheets

CELL SEARCH METHOD AND APPARATUS IN WIRELESS COMMUNICATION SYSTEM

PRIORITY

This application claims the benefit under 35 U.S.C. §119(a) of a Korean patent application filed in the Korean Intellectual Property Office on Nov. 21, 2008 and assigned Serial No. 10-2008-0115971, the entire disclosure of which is hereby incorporated by reference.

BACKGROUND OF THE INVENTION

1. Field of the Invention

The present invention relates to wireless communications. More particularly, the present invention relates to a cell search method and apparatus in an asynchronous wireless communication system for outputting a cell search result by comparing energy ratios of detected candidate cells with a reference threshold ratio.

2. Description of the Related Art

Universal Mobile Telecommunication System (UMTS) is an asynchronous wireless communication system. In the UMTS communication system, base stations are identified by cell specific codes. Assuming the UMTS system has 512 cells, i.e., base stations, each base station is assigned a unique cell identity code.

Since it is time-consuming for a User Equipment (UE) to inspect all 512 cell identity codes to search for a cell it belongs to, a normal algorithm is inefficient to adopt for a cell search procedure. For this reason, the 512 base stations are divided into a number of code groups (e.g., 64 code groups) that are identified by a code group number. In this case, each code group includes 8 specific cell codes.

In the UMTS, the cell search procedure is performed in a stepwise manner. The first step of the cell search procedure is to acquire slot synchronization to a cell with a timeslot in which a Primary Synchronization Channel signal is received at a peak power value. The second step of the cell search procedure is to acquire frame synchronization and identify a code group of the cell found in the first step using the Secondary Synchronization Channel. Finally, the third step of the cell search procedure is to determine a cell specific code used by the found cell through symbol-by-symbol correlation over a Primary Common Pilot Channel (P-CPICH) with all codes within the code group identified at the second step.

At each step of the cell search procedure, an absolute threshold value is used such that, only when the energy of the found cell is greater than the threshold value, a result value of the corresponding step is output. The threshold value is determined as an energy level corresponding to a false alarm probability and a detection probability derived from an energy distribution estimated through a simulation or field test. Accordingly, the threshold value for the cell search procedure is set depending on a cell searcher design.

A radio channel is characterized by a time and location varying property. More particularly in a place surrounded by buildings and having high user density, external interferences increase significantly. Accordingly, a conventional cell search method using the absolute threshold value is likely to cause an unstable change of the threshold value in a rapid variation of a radio channel environment, resulting in malfunctioning of a cell search operation.

Also, the conventional cell search method has a drawback in that the threshold value has to be set differently depending on a difference between the synchronous and asynchronous accumulation durations, and between bit designs of cell searchers.

Therefore, a need exists for a method and apparatus for selecting result values of a cell search process that is not influenced by design change of the cell searcher and variation of the communication environment.

SUMMARY OF THE INVENTION

An aspect of the present invention is to address at least the above-mentioned problems and/or disadvantages and to provide at least the advantages described below. Accordingly, an aspect of the present invention is to provide a cell search method and apparatus for obtaining a constant cell search result regardless of a cell searcher design change and a communication environment variation.

In accordance with an aspect of the present invention, a cell search method in a wireless communication system operating with a stepwise cell search procedure is provided. The method includes determining energy values of correlations between different phases of signals received from neighbor cells, detecting at least one candidate cell in descending order of energy values, and outputting cell search results by determining an energy ratio of the at least one candidate cell and comparing the energy ratio with a reference threshold ratio.

The outputting of the cell search results may include sorting the at least one candidate cell in order of energy value, selecting at least one candidate cell as a reference candidate cell, determining the energy ratio of the at least one candidate cell to the reference candidate cell, and outputting candidate cells of which energy ratios are greater than the reference threshold ratio.

The reference threshold ratio may be a predefined value based on a specific false alarm probability and detection probability.

The reference candidate cell may be the candidate cell of which energy value is the least among the at least one candidate cell.

In accordance with another aspect of the present invention, a cell search apparatus for a wireless communication system operating a stepwise cell search procedure is provided. The apparatus includes an energy calculator for determining energy values of correlations between different phases of signal received from neighbor cells, a candidate cell detector for detecting at least one candidate cell in descending order of energy value, and a cell search result determiner for outputting cell search results by determining an energy ratio of the at least one candidate cell and for comparing the energy ratio with a reference threshold ratio.

The cell search result determiner may include a candidate cell sorter for sorting the at least one candidate cell in order of energy value, a ratio calculator for selecting one of the at least one candidate cell as a reference candidate cell and for determining the energy ratio of the at least one candidate cell to the reference candidate cell, and a selector for outputting the candidate cell of which energy ratios are greater than the reference threshold ratio.

The reference threshold ratio may be a predefined value based on a specific false alarm probability and detection probability.

The reference candidate cell may be the candidate cell of which energy value is the least among the at least one candidate cell.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, the term "neighbor cell" denotes service coverage of a base station in which a cell searcher is located.

Also, the term "candidate cell" denotes a potential cell of which energy of correlation value is sufficient compared to that of a neighbor cell to be selected as a result value of a cell search procedure.

Figure 1:
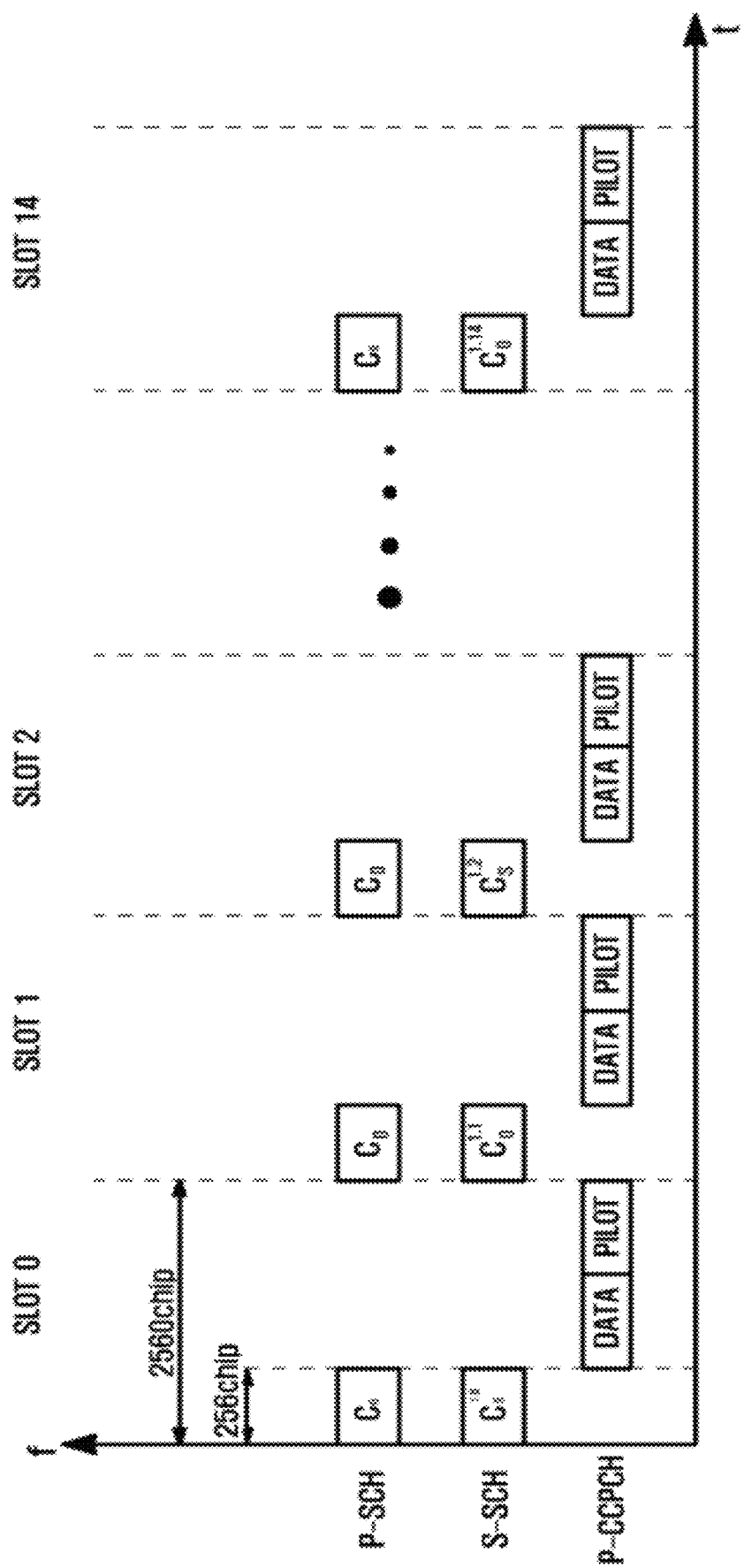
FIG. 1 is a conventional diagram illustrating a structure of a synchronization channel in a Universal Mobile Telecommunication System (UMTS)

FIG. 1 is a conventional diagram illustrating structures of synchronization channels in a Universal Mobile Telecommunication System (UMTS). In the following description, first to third steps of a cell search procedure are described with reference to channel structures of FIG. 1.

Referring to FIG. 1, a UMTS frame is divided into 15 slots in the time domain and each slot has a length of 2560 chips.

A Primary Synchronization Channel (P-SCH) has the same code for every base station in the UMTS system. A base station transmits a Primary Synchronization Code (PSC) 'C0' during a first ¹⁄₁₀ duration of every slot, i.e., first 256 chips. A User Equipment (UE) receives the P-SCH transmitted by the base station and acquires slot synchronization to the base station using the PSC. This is the first step of the cell search procedure.

The base station transmits a Secondary Synchronization Channel (S-SCH) in parallel with the P-SCH. The S-SCH consists of repeatedly transmitting a group number of a code group the base station belongs to among 64 code groups.

After acquiring the slot synchronization to the base station, the UE finds frame synchronization and identifies the code group of a found base station. This is the second step of the cell search procedure.

The base station also transmits a Primary Common Control Physical Channel (P-CCPCH) along with the S-SCH. The P-CCPCH is composed of a pilot symbol and a data symbol of each slot and spread by the cell identity code (i.e., base station identity code).

During the first to third steps of the cell search procedure, a threshold is used and the conventional system uses a threshold set to an absolute value. If an energy level of a found cell is greater than the threshold value, the cell search procedure progresses to a next step with a result value.

If the threshold value is set to an absolute value, the cell search procedure may be influenced by the cell searcher design and/or communication environment. In an exemplary implementation, a method for obtaining the result value of the cell search procedure is provided without influence by the cell searcher design change and the communication environment variation.

Figure 2:
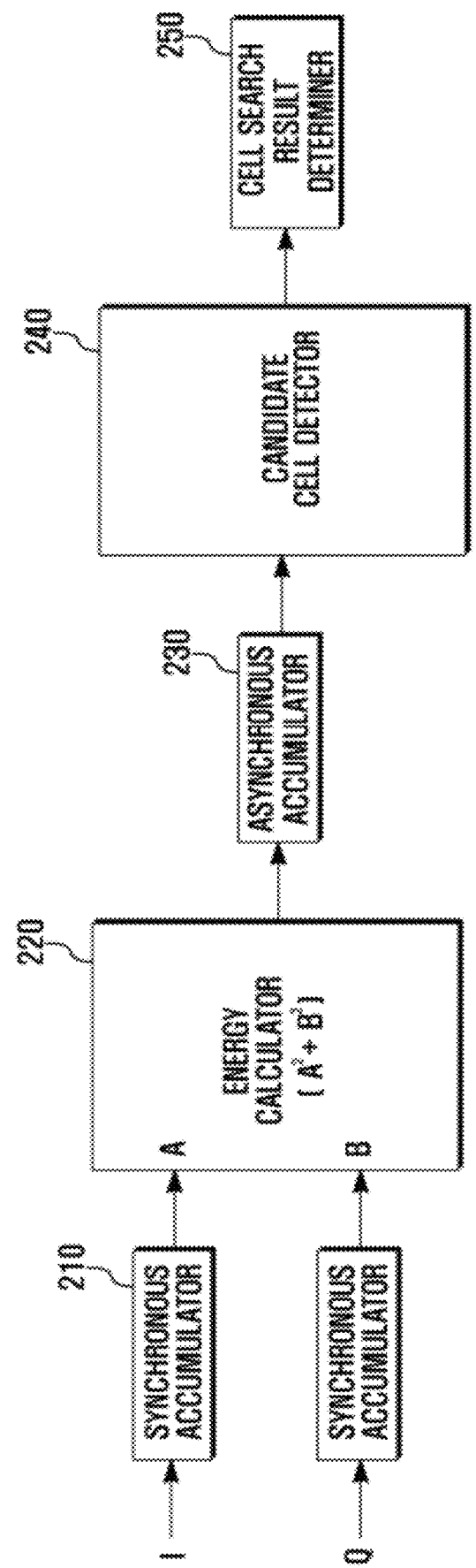
FIG. 2 is a block diagram illustrating a configuration of a cell searcher for a wireless communication according to an exemplary embodiment of the present invention.

FIG. 2 is a block diagram illustrating a configuration of a cell searcher for a wireless communication according to an exemplary embodiment of the present invention. As illustrated in FIG. 2, the cell searcher includes a pair of synchronous accumulators 210, an energy calculator 220, an asynchronous accumulator 230, a candidate cell detector 240 and a cell search result determiner 250. The cell searcher may be commonly applied for the first to third steps of the cell search procedure.

The synchronous accumulators 210 accumulate and store correlations determined at every slot of neighbor cell signals. That is, the synchronous accumulators 210 accumulate the correlations determined during a synchronous accumulation period defined by a number of slots including a slot 0, slot 1, slot 2, . . . , and slot n, and store the accumulated correlation values. If the synchronous accumulation period has expired, the synchronous accumulators 210 output the accumulated correlation values to the energy calculator 220.

The energy calculator 220 determines the energy of the correlation value at each slot. In order to obtain the energy of the correlation value of each slot, the energy calculator 220 determines a size of the signals input in a different phase. The energy calculator 220 outputs the determined energy to the asynchronous accumulator 230.

The asynchronous accumulator 230 accumulates the energy value output by the energy calculator 220 during an asynchronous accumulation period and stores the accumulated energy value. That is, the asynchronous accumulator 230 accumulates the energy values determined during the asynchronous accumulation period defined by a number of slots including the slot 0, slot 1, slot 2, . . . , and slot n. If the asynchronous accumulation period has expired, the asynchronous accumulator 230 outputs the accumulated energy values to the candidate cell detector 240.

The candidate cell detector 240 receives the accumulated energy values output by the asynchronous accumulator 230. The candidate cell detector 240 detects n peak values in descending order of the energy value and determines candidate cells based on the peak values. The candidate cell information is output to the cell search result determiner 250.

The cell search result determiner 250 receives information regarding the candidate cells sorted in descending order of the peak values. The cell search result determiner 250 sorts the n candidate cells in descending order of energy value and determines energy ratios of the candidate cells to that of a selected candidate cell. The cell search result determiner 250 then compares the energy ratios to a reference threshold ratio for outputting a result value of corresponding step of the cell search procedure. Here, the reference threshold ratio may be a value corresponding to a specific false alarm probability and detection probability. The cell search result determiner 250 then outputs the candidate cells of which the energy ratios are greater than the reference threshold ratio as a result of a corresponding step.

Acquiring the stable result value at each step of the cell search procedure as compared to the conventional cell search method is described hereinafter.

The energy value of a candidate cell that is detected by the candidate cell detector 240 may be expressed as equation (1):

$$E = \sum_{j=0}^{L} \left\{ \left( \sum_{i=0}^{N} I \times C \right)^2 + \left( \sum_{i=0}^{N} Q \times C \right)^2 \right\} \quad (1)$$

wherein, I denotes an in-phase input of the cell searcher, Q denotes a quadrature-input of the cell searcher, C denotes a synchronization code or a Primary Scrambling Code, N denotes a synchronous accumulation period and L denotes an asynchronous accumulation period.

It is assumed herein that the energy value of a candidate cell which is selected as a reference energy value is I×C, and the energy value of any cell among the remaining candidate cells is $E_2$. Also, it is assumed herein that I×C of $E_1$ has a value 'a', Q×C of $E_1$ has a value 'b', I×C of $E_2$ has a value '2a', and Q×C of $E_2$ has a value '2b'.

Under the above assumptions, $E_1$ and $E_2$ may be expressed as respective equations (2) and (3):

$$E_1 = \sum_{j=0}^{L} \left\{ \left( \sum_{i}^{N} a \right)^2 + \left( \sum_{i=0}^{N} b \right)^2 \right\} \quad (2)$$

$$E_2 = \sum_{j=0}^{L} \left\{ \left( \sum_{i}^{N} 2a \right)^2 + \left( \sum_{i=0}^{N} 2b \right)^2 \right\} \quad (3)$$

$$= 4 \times \sum_{j=0}^{L} \left\{ \left( \sum_{i}^{N} a \right)^2 + \left( \sum_{i=0}^{N} b \right)^2 \right\}$$

In this case, $E_1$ and the ratio of $E_2$ to $E_1$ may be expressed as equation (4):

$$E_2/E_1 = 4 \quad (4)$$

Accordingly, the ratio of $E_2$ to $E_1$ is constant regardless of the synchronous accumulation period N and the asynchronous accumulation period L.

Similarly, if a bit number required for a bit design is changed, the energy of the output value will be changed. As analogous from equations (2) to (4), the ratio of $E_2$ to $E_1$ is constant if the bit number is changed.

Accordingly, it is possible to acquire a stable cell search result by determining the energy ratios of a plurality of candidate cells detected by the candidate cell detector 240 and outputting the result value of each step when the determined energy ratio is greater than a reference threshold ratio. That is, the cell search method according to an exemplary embodiment of the present invention may output a constant cell search result without influence by changes of the cell searcher design and communication environment.

Figure 3:
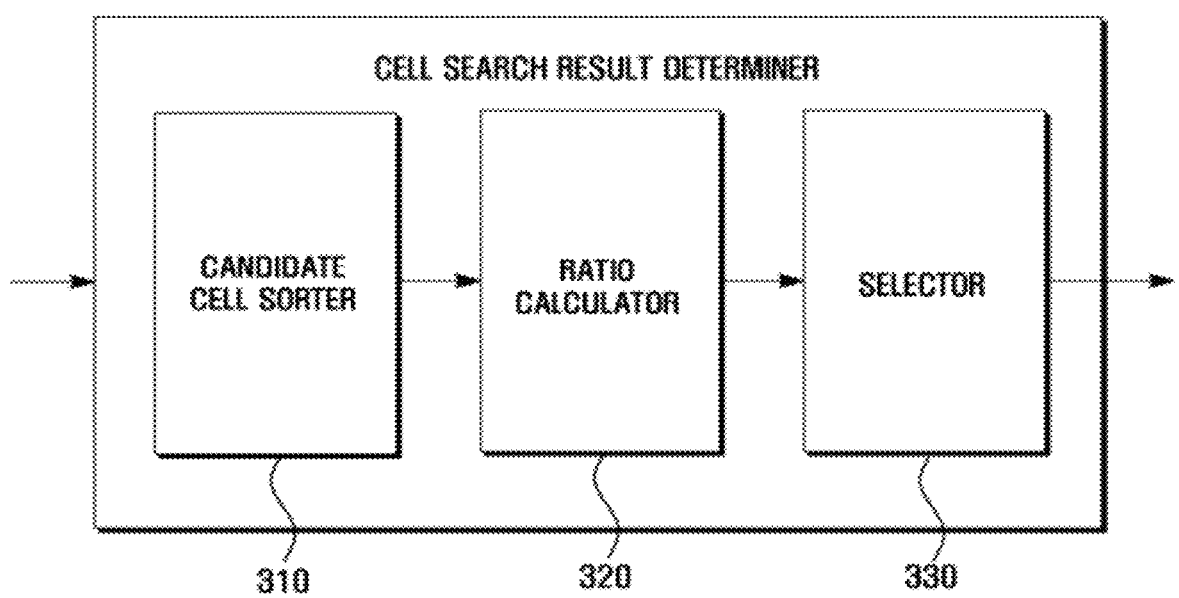
FIG. 3 is a block diagram illustrating a configuration of a cell search result determiner according to an exemplary embodiment of the present invention.

FIG. 3 is a block diagram illustrating a configuration of a cell search result determiner according to an exemplary embodiment of the present invention.

Referring to FIG. 3, the cell search result determiner 250 includes a candidate cell sorter 310, a ratio calculator 320 and a selector 330.

The candidate cell sorter 310 receives information on candidate cells corresponding to n energy values detected by the candidate cell detector 240. The candidate cell sorter 310 creates a list of the candidate cells sorted in order of energy value. For instance, the candidate cells are listed in an order of 1, 2, 3, . . . , n. The candidate cell sorter 310 then outputs the candidate cell list to the ratio calculator 320.

If the candidate cell list having n candidate cells sorted in order of energy value is received, the ratio calculator 320 selects a reference candidate cell among the n candidate cells. In an exemplary implementation, the cell having the least energy value among the candidate cells, i.e., nth cell, is selected as the reference candidate cell. Hereinafter, a description is made under the assumption that the energy ratios of the candidate cells are determined with respect to the nth candidate cell as the reference candidate cell.

The ratio calculator 320 determines the ratios of the energy values of n−1 candidate cells to that of the reference candidate cell. That is, the ratio of the energy values of the candidate cell to that of the reference candidate cell is determined using equation (5):

ratio1=(energy value of the first candidate cell)/(energy value of nth candidate cell)

ratio2=(energy value of the second candidate cell)/(energy value of nth candidate cell)

ratio3=(energy value of the third candidate cell)/(energy value of nth candidate cell)

Ratio(n−1)=(energy value of the (n−1)th candidate cell)/(energy value of nth candidate cell).

The ratio calculator 320 repeats the ratio determination to obtain the ratios of energy values of the n−1 candidate cells to the reference candidate cell and then outputs the energy ratios of the candidate cells to the selector 330.

If the energy ratios of the candidate cell are received from the ratio calculator, the selector 330 compares the respective energy ratios with a reference threshold ratio. Here, the reference threshold ratio is previously stored for outputting the energy ratios as result values at a respective step of the cell search procedure. The reference threshold ratio is set to a value corresponding to a specific false alarm probability and detection probability. The reference threshold ratio may be set to different values for respective steps of the cell search procedure.

As a result of the comparison, the selector 330 outputs the candidate cells of which energy ratios are greater than the reference threshold ratio as the result value of the corresponding step of the cell search procedure.

Figure 4:
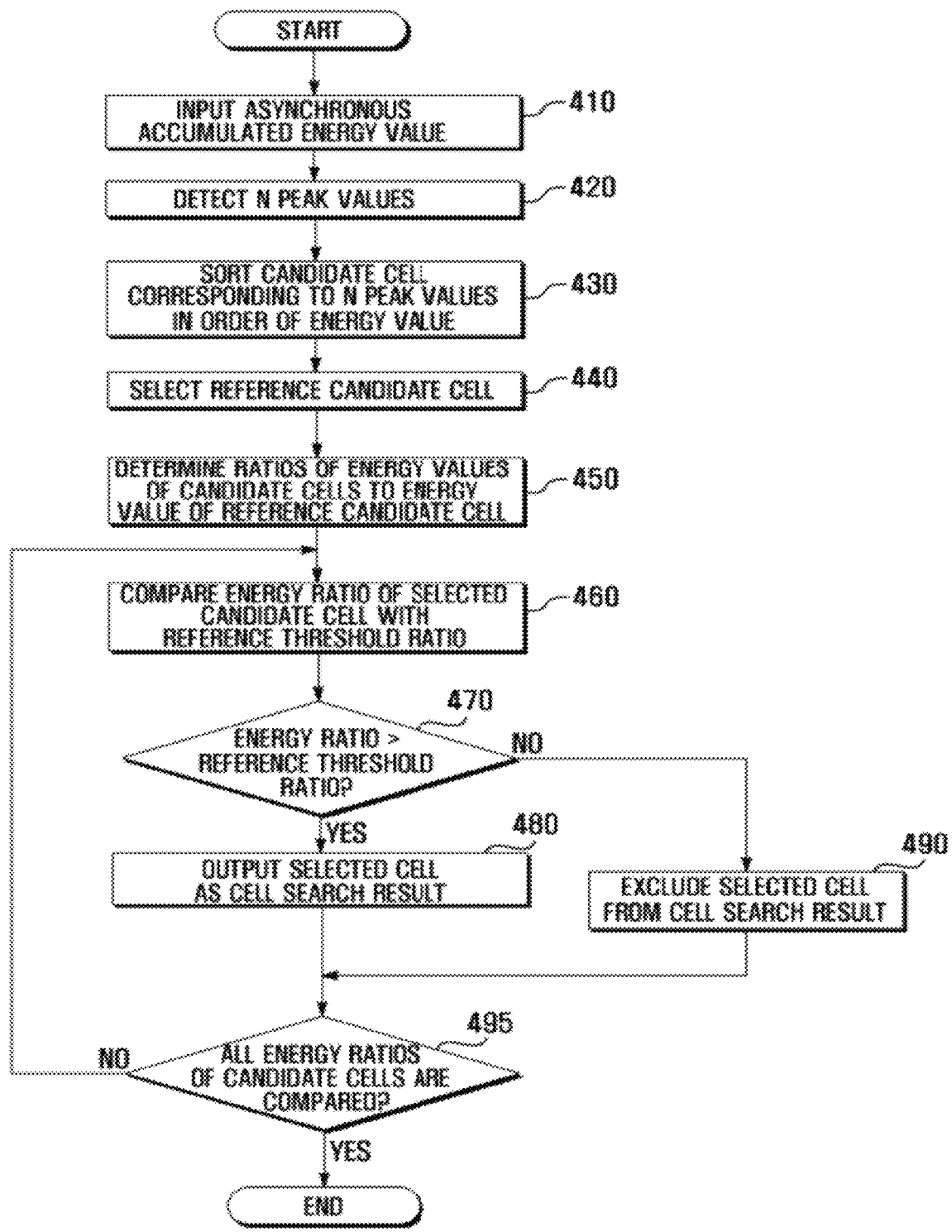
FIG. 4 is a flowchart illustrating a cell search method for a wireless communication system according to an exemplary embodiment of the present invention.

FIG. 4 is a flowchart illustrating a cell search method for a wireless communication system according to an exemplary embodiment of the present invention. The process depicted in FIG. 4 may be commonly applied for the first to third steps of the cell search procedure.

Referring to FIG. 4, the candidate cell detector 240 of the cell searcher receives energy values accumulated by the asynchronous accumulator 230 during the asynchronous accumulation period in step 410. Once the energy values are received, the candidate cell detector 240 detects n peak values in descending order in step 420.

The cell search result determiner 250 then receives the n peak values output by the candidate cell detector 240 and lists the candidate cells corresponding to the n peak values in order of energy value in step 430. The cell search result determiner 250 then selects one of the n candidate cells as a reference candidate cell in step 440. In an exemplary implementation, the candidate cell having the least energy value among the n candidate cells (i.e., nth candidate cell) is selected as the reference candidate cell.

The cell search result determiner 250 determines the ratios of the energy values of the remaining candidate cells to the energy value of the reference candidate cell in step 450.

After determining all the ratios of the energy values of the (n−1)th candidate cells to that of the reference candidate cell, the cell search result determiner 250 selects a specific candidate cell and compares the energy ratio of the selected candidate cell with the reference threshold ratio in step 460. Here, the reference threshold ratio is a previously stored reference value for outputting a result value at each step of the cell search procedure. The reference threshold ratio may be set to a value corresponding to a false alarm probability and detection probability, and may be set to different values for the respective steps of the cell search procedure.

The cell search result determiner 250 determines whether the energy ratio of the selected candidate cell is greater than the reference threshold ratio in step 470. If the energy ratio of the selected candidate cell is greater than the reference threshold ratio, the cell search result determiner 250 outputs the selected cell information as the cell search result in step 480. Otherwise, if the energy ratio of the selected candidate cell is not greater than the reference threshold ratio, the cell search result determiner 250 excludes the selected cell from the cell search result in step 490.

The cell search result determiner 490 then determines whether all the energy ratios of the candidate cells are compared to the reference threshold ratio in step 495. If not all the energy ratios of the candidate cells are compared to the reference threshold ratio, the process proceeds to step 460 for the next candidate cell. Otherwise, if all the energy ratios of the candidate cells are compared to the reference threshold ratio, the process ends.

As described above, the cell search method and apparatus according to an exemplary embodiment of the present invention acquires a stable cell search result even in a rapidly varying channel environment. Also, the cell search method and apparatus acquires a stable cell search result by using a constant threshold ratio regardless of a design change of the cell searcher.

While the invention has been shown and described with reference to certain exemplary embodiments thereof, it will be understood by those skilled in the art that various changes in form and details may be made therein without departing from the spirit and scope of the invention, as defined by the appended claims and their equivalents.

What is claimed is:

1. A cell search method in a wireless communication system operating with a stepwise cell search procedure, the method comprising:
   determining energy values of correlations between different phases of signals received from neighbor cells;
   detecting at least one candidate cell in descending order of energy values; and
   outputting cell search results by determining an energy ratio of the at least one candidate cell and comparing the energy ratio with a reference threshold ratio.

2. The method of claim 1, wherein the correlations between different phases of signals received from the neighbor cells are accumulated and stored for a certain period.

3. The method of claim 1, wherein the energy values of the correlations are accumulated and stored for a certain period.

4. The method of claim 1, wherein the energy values of the correlations are determined based on a size of the signals in the different phases.

5. The method of claim 1, wherein the energy values of the at least one candidate cell are detected in descending order based on peak values.

6. The method of claim 1, wherein the outputting of the cell search results comprises:
   sorting the at least one candidate cell in order of energy value;
   selecting at least one candidate cell as a reference candidate cell;
   determining the energy ratio of the at least one candidate cell to the reference candidate cell; and
   outputting candidate cells of which energy ratios are greater than the reference threshold ratio.

7. The method of claim 6, wherein the reference candidate cell comprises the least energy value among the candidate cells.

8. The method of claim 6, wherein the reference threshold ratio comprises a predefined value based on a specific false alarm probability and detection probability.

9. The method of claim 6, wherein the reference candidate cell comprises the candidate cell of which energy value is the least among the at least one candidate cell.

10. A cell search apparatus for a wireless communication system operating a stepwise cell search procedure, the apparatus comprising:
    an energy calculator for determining energy values of correlations between different phases of signals received from neighbor cells;
    a candidate cell detector for detecting at least one candidate cell in descending order of energy value; and
    a cell search result determiner for outputting cell search results by determining an energy ratio of the at least one candidate cell and for comparing the energy ratio with a reference threshold ratio.

11. The apparatus of claim 10, wherein the correlations between different phases of signals received from the neighbor cells are accumulated and stored by synchronous accumulators for a certain period.

12. The apparatus of claim 10, wherein the energy values of the correlations from the energy calculator are accumulated and stored by an asynchronous accumulator for a certain period.

13. The apparatus of claim 10, wherein the energy calculator determines a size of the signals in the different phases to determine the energy values of the correlations.

14. The apparatus of claim 10, wherein the energy values of the at least one candidate cell are detected in descending order based on peak values.

15. The apparatus of claim 10, wherein the cell search result determiner comprises:
- a candidate cell sorter for sorting the at least one candidate cell in order of energy value;
- a ratio calculator for selecting one of the at least one candidate cell as a reference candidate cell and for determining the energy ratio of the at least one candidate cell to the reference candidate cell; and
- a selector for outputting the candidate cell of which energy ratios are greater than the reference threshold ratio.

16. The apparatus of claim 15, wherein the reference candidate cell comprises the least energy value among the candidate cells.

17. The apparatus of claim 15, wherein the reference threshold ratio comprises a predefined value based on a specific false alarm probability and detection probability.

18. The apparatus of claim 15, wherein the reference candidate cell is the candidate cell of which energy value comprises the least among the at least one candidate cell.

* * * * *